(12) United States Patent
Ryver

(10) Patent No.: US 11,558,403 B2
(45) Date of Patent: Jan. 17, 2023

(54) QUANTUM COMPUTING MACHINE LEARNING FOR SECURITY THREATS

(71) Applicant: International Business Machines Corporation, Armonk, NY (US)

(72) Inventor: Kelly Nicole Ryver, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 16/867,586

(22) Filed: May 6, 2020

(65) Prior Publication Data

US 2021/0352087 A1 Nov. 11, 2021

(51) Int. Cl.
| H04L 9/40 | (2022.01) |
| G06F 21/57 | (2013.01) |
| G06N 10/00 | (2022.01) |
| G06N 20/00 | (2019.01) |
| G06F 17/16 | (2006.01) |

(52) U.S. Cl.
CPC .......... H04L 63/1416 (2013.01); G06F 17/16 (2013.01); G06N 10/00 (2019.01); G06N 20/00 (2019.01)

(58) Field of Classification Search
None
See application file for complete search history.

(56) References Cited

U.S. PATENT DOCUMENTS

| 10,990,677 | B2 * | 4/2021 | Wiebe | .................. G06N 3/0454 |
| 2018/0097826 | A1 | 4/2018 | Luan et al. | |
| 2018/0349605 | A1 * | 12/2018 | Wiebe | ...................... G06N 3/06 |
| 2018/0367561 | A1 | 12/2018 | Givental | |
| 2019/0149564 | A1 | 5/2019 | McLean | |
| 2019/0208412 | A1 | 7/2019 | Lord et al. | |
| 2019/0260804 | A1 * | 8/2019 | Beck | ................... H04L 63/1483 |
| 2020/0036743 | A1 * | 1/2020 | Almukaynizi | ......... G06N 5/048 |
| 2021/0281583 | A1 * | 9/2021 | Okunlola | ................ G06F 40/30 |

FOREIGN PATENT DOCUMENTS

WO  2017223294 A1  12/2017

OTHER PUBLICATIONS

"Nathan Wiebe, Hardening quantum machine learning against adversaries, 2018, New Journal of Physics, pp. 1-27" (Year: 2018 ).*

(Continued)

*Primary Examiner* — Joseph P Hirl
*Assistant Examiner* — Hassan Saadoun
(74) *Attorney, Agent, or Firm* — Donald J. O'Brien

(57) ABSTRACT

Embodiments are disclosed for a method for a security model. The method includes generating a Bloch sphere based on a system information and event management (SIEM) of a security domain and a structured threat information expression trusted automated exchange of indicator information. The method also includes generating a quantum state probabilities matrix based on the Bloch sphere. Further, the method includes training a security threat model to perform security threat classifications based on the quantum state probabilities matrix. Additionally, the method includes performing a machine learning classification of the security domain based on the quantum state probabilities matrix.

25 Claims, 10 Drawing Sheets

(56) References Cited

OTHER PUBLICATIONS

IBM Appendix P., "List of IBM Patents or Patent Applications to be Treated as Related", Dated Herewith, 2 pages.
Lloyd, Seth, et al., "Quantum embeddings for machine learning," arXiv preprint arXiv:2001.03622v2, Feb. 10, 2020, 11 pages.
Ryver et al., "Quantum Computing Machine Learning for Security Threats", U.S. Appl. No. 17/647,090, filed Jan. 5, 2022, 44 Pgs.
Arslan et al., "A study on the use of quantum computers, risk assessment and security problems", Conference Paper—Mar. 2018, 7 pages.
Mell et al., "The NIST Definition of Cloud Computing", Recommendations of the National Institute of Standards and Technology, Sep. 2011, 7 pages.
"Patent Cooperation Treaty PCT Notification of Transmittal of the International Search Report and the Written Opinion of the International Searching Authority, or the Declaration", Applicant's file reference P2019008484, International Application No. PCT/EP2021/059812, International filing date Apr. 15, 2021, dated Jul. 21, 2021, 13 Pgs.
Attiah et al., "A Game Theoretic Approach to Model Cyber Attack and Defense Strategies", College of Engineering and Computer Science, University of Central Florida, FL USA, Accessed on Oct. 4, 2018, 978-1-4286-3180-5/18 2018 IEEE, 8 Pgs.
Rugers., "Risk Management and the Quantum Threat", A Thesis submitted in partial fulfillment for the degree of Master of Science at the Cyber Security Academy, Jan. 2018, 83 Pgs.

\* cited by examiner

QUANTUM COMPUTING MACHINE LEARNING FOR SECURITY THREATS

BACKGROUND

The present disclosure relates to security threats, and more specifically, to quantum computing machine learning for security threats.

Machine learning models can be computer coded algorithms configured to learn how to perform specific classifications. A classification can be a determination that the machine learning models make to label a specific state. For example, in the field of computer security, a classification can involve analyzing the state of a computer system, determining whether the system is under threat of attack, and labeling the computer state accordingly. Thus, an example machine learning model for security threats can perform classifications of computer systems as either safe or threatened.

Conventional computing is useful for identifying potential security threats using models that can break the problem of identifying security threats down to a manageable level of complexity. However, conventional approaches can rely on assumptions about how malicious actors, such as hackers and malware, have behaved in the past. Thus, conventional approaches may not be suited for identifying security threats with new or unseen behaviors.

Further, the increasing sophistication of computing technology creates a race between those developing security threats and those attempting to stop security threats. Thus, without new approaches to identify security threats, emerging technologies, such as artificial intelligence; game theory; and the like, may have the potential to raise the complexity of identifying security threats beyond the solution power of conventional computers.

SUMMARY

Embodiments are disclosed for a method for a security model. The method includes generating a Bloch sphere based on a system information and event management (SIEM) of a security domain and a structured threat information expression trusted automated exchange of indicator information. The method also includes generating a quantum state probabilities matrix based on the Bloch sphere. Further, the method includes training a security threat model to perform security threat classifications based on the quantum state probabilities matrix. Additionally, the method includes performing a machine learning classification of the security domain based on the quantum state probabilities matrix. Advantageously, such embodiments are useful for identifying security threats more quickly than current threat solutions. In an additional advantage, such embodiments are useful for identifying artificially intelligent malicious actors.

Optionally, in some embodiments, the method further includes determining that a malicious actor performs a specific category of attack based on a previous category of attack and the quantum state probabilities matrix. In another optional embodiment, the method further includes determining that the malicious actor performs a specific attack method of the specific category of attack based on the specific category of attack and the quantum state probabilities matrix. Advantageously, such embodiments are useful for identifying specific attack methods and specific categories of attack more quickly than current threat solutions.

An additional embodiment is disclosed for a method for a security model. The method includes generating a Bloch sphere based on a SIEM of a security domain and a STIX-TAXII. The method also includes generating a quantum state probabilities matrix based on the Bloch sphere. Additionally, the method includes training a security threat model to perform a security threat classification based on the quantum state probabilities matrix. Further, the security threat classification infers a next category of attack against the security domain based on a previous category of attack. Advantageously, such embodiments are useful for identifying security threats more quickly than current threat solutions. In an additional advantage, such embodiments are useful for identifying artificially intelligent malicious actors.

An additional embodiment is disclosed for a method for a security model. The method includes generating a Bloch sphere based on a SIEM of a security domain and a STIX-TAXII. The method also includes generating a quantum state probabilities matrix based on the Bloch sphere. The quantum state probabilities matrix includes multiple probabilities representing a likelihood that a malicious actor moves between all potential combinations of categories of attack. Additionally, the multiple probabilities of the quantum state probabilities matrix represent a likelihood that the malicious actor uses a specific attack method of all of the categories of attack based on a previous category of attack. Further, the method includes training a security threat model to perform a security threat classification based on the quantum state probabilities matrix. The security threat classification infers a next category of attack against the security domain based on the previous category of attack. Advantageously, such embodiments are useful for identifying security threats more quickly than current threat solutions. In an additional advantage, such embodiments are useful for identifying artificially intelligent malicious actors.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
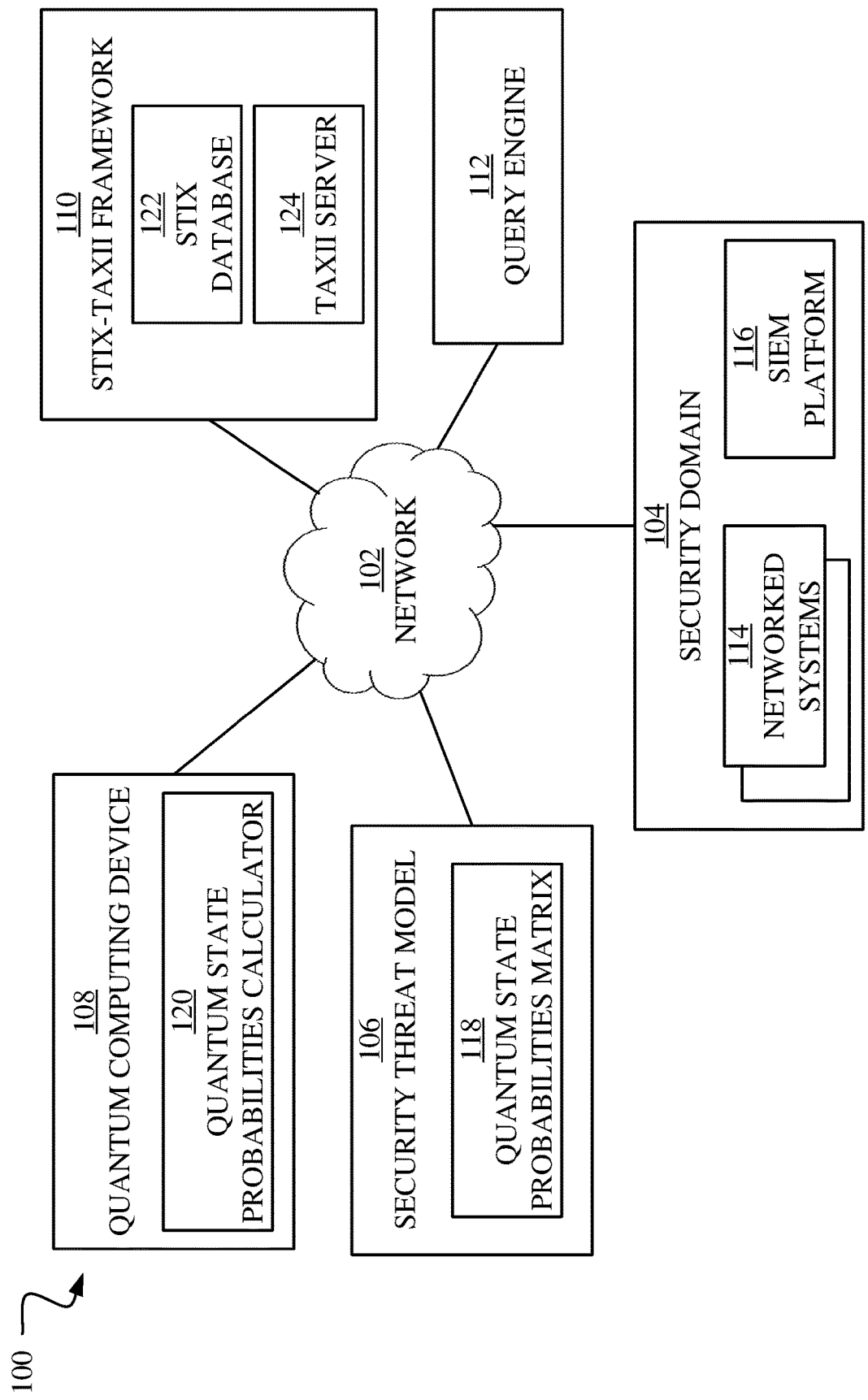
FIG. 1 is a block diagram of an example system for a quantum computing based machine learning model, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

Machine learning is a useful way to identify potential security threats for computer systems and networks. Many machine learning models rely on particular frameworks for analyzing potential security threats. Three example industry frameworks include the Diamond Model of Intrusion Analysis, Structured Threat Information eXpression-Trusted Automated eXchange of Indicator Information (STIX-TAXII) Framework, and Lockheed Martin Cyber Kill Chain®. These three frameworks are useful tools for determining how a malicious actor or adversary may attack. Interestingly, these frameworks are based upon kinetic warfare models, such as, those used on the physical battlefield. Accordingly, these traditional frameworks are referred to herein as linear (and kinetic) because on the physical battlefield, a soldier or group of soldiers may move, or launch weapons that move, in straight lines from one geographic position to another.

The Diamond framework states that everyone (person, company or group) is a victim or adversary. Adversaries can become victims, and victims can become adversaries. This philosophy is loosely based upon Sun Tzu's *The Art of War*. The typical (kinetic/symmetric) attack will show an adversary utilizing their capability to exploit some kind of infrastructure to get to a victim. The Diamond framework can use a stochastic model for determining (to an extent) the probability of an adversary gaining access to the victim via a particular path of attack.

The Lockheed Martin Cyber Kill Chain® specifies a sequence of attack methods. The attack methods include reconnaissance, weaponization, delivery, exploitation, installation, command and control (C&C), and actions on objectives. Reconnaissance refers to a malicious actor's surveillance of a potential target for attack. Weaponization can involve the use of a target system's tools to facilitate the attack. For example, a malicious actor or malware can acquire a system credential that provides login access to a computer system, and weaponize the credential by using it to break into the computer system for a malicious purpose. Delivery and exploitation can involve the initial access to the target system. Installation refers to copying an executable version of malware on to the target system. The term, "command and control," refers to a state where the malicious actor and/or malware have complete control of the target system. The attack method, "actions on objectives," can involve the actions taken once the bad actor has access, such as, stealing or exfiltrating data. Within security domains of potential target systems, such data can include state secrets, trade secrets, bank and credit card accounts, person emails and pictures, and the like.

The Lockheed Martin Cyber Kill Chain® includes a subset of the attack methods of the STIX-TAXII framework. Further, the STIX-TAXII framework places attack methods in a different order, i.e., sequence. The STIX-TAXII framework can be described as kinetic with respect to its perspective on attack strategy. The EXAMPLE STIX-TAXXI FRAMEWORK below includes a table of attack methods arranged in categories. These categories and attack methods are merely a subset of the STIX-TAXII framework, which currently includes 433 attack methods, but continues to grow.

| Initial Access (A) | Execution(B) | Persistence(C) | Privilege Escalation(D) | Defense Evasion(E) | Credential Access(F) |
|---|---|---|---|---|---|
| Drive-by compromise | AppleScript | .bash_profile and .bashrc | Access token manipulation | Access token manipulation | Account manipulation |
| Exploit public-facing app | CMSTP | Accessibility features | Accessibility features | Binary padding | Bash history |

Example STIX-TAXXI Framework

The assumption in these types of these frameworks is that a malicious actor starts with Initial Access (A). Once access to the environment is gained, the actor can begin Execution (B) of some kind of malware (i.e., bot, virus, worm, trojan). From there, the actor can move to Persistence (C), and so on through the entire framework. Another assumption in such frameworks is that the adversary will start with some kind of exploit and progress down the attack chain in a linear, or kinetic, fashion. Thus, if the malicious actor is not successful with the first Initial Access attack method, the drive-by compromise, this actor may move down the Initial Access column, and next attempt to exploit a public-facing application (app). However, if drive-by compromise is successful, the malicious actor may move to the next column in the STIX-TAXII framework by performing an attack method in the Execution category.

One reason that these frameworks have been useful is that they can determine the probability with which a malicious actor may take a next step in the kill chain or STIX-TAXII framework. In this way, machine learning models that rely on these frameworks may make their classifications based on a view that malicious actors are linear thinkers, thus, consistently moving from step A to B to C, and so on. However, it is possible for malicious actors (such as, artificially intelligent malware) to violate this view. As such, these frameworks may not be as useful for the cyber battlefield, where malicious actors may not move in the straight lines of a particular framework. For example, artificially intelligent adversaries such as, generative adversarial networks and quantum computing based attackers, may move randomly through the events laid out in the EXAMPLE STIX-TAXII FRAMEWORK.

Classical computing provides benefits to organizations and individuals around the world. However, there are challenges that conventional systems cannot solve within reasonable time frames. More specifically, for problems above a certain size and complexity, there is a lack of computational power using traditional binary computer processors (e.g., computing methods that use bits of values of 0 or 1) to tackle them. One approach for attempting to solve some of these problems involves a relatively new kind of computing: universal quantum computing. Universal quantum computers can leverage the quantum mechanical phenomena of superposition and entanglement to create states that scale exponentially with number of qubits, also referred to herein as quantum mechanical system and quantum bits.

Accordingly, embodiments of the present disclosure provide a quantum computing based machine learning model for identifying potential security threats. This model may be able to determine multiple probabilities of a malicious actor moving from a one category of attack to any one of multiple categories of attacks. Additionally, this model may be able to determine the probabilities of the malicious actor moving from one attack method to any one of multiple attack methods.

For example, the quantum computing based machine learning model can determine the probabilities of a malicious actor moving from Initial Access to each of Execution, Persistence, Privilege Escalation, Defense Evasion, and Credential Access once access has been gained. Additionally, the quantum computing based machine learning model can determine the probabilities that a malicious actor will select each of the potential attack methods in each of the categories of attack.

FIG. 1 is a block diagram of an example system 100 for a quantum computing based machine learning model, in accordance with some embodiments of the present disclosure. The system 100 includes a network 102, a security domain 104, a security threat model 106, a quantum computing device 108, a trusted automated exchange of information, such as a structured threat information expression-trusted automated exchange of indicator information (STIX-TAXII) framework 110, and query engine 112.

Network 102 may include one or more computer communication networks. An example network 102 can include the Internet, a local area network (LAN), a wide area network (WAN), a wireless network such as a wireless LAN (WLAN), or the like. Network 102 may comprise copper transmission cables, optical transmission fibers, wireless transmission, routers, firewalls, switches, gateway computers and/or edge servers. A network adapter card or network interface in each computing/processing device implemented as part of the security domain 104, security threat model 106, quantum computing device 108, STIX-TAXII framework 110, and query engine 112, for example, may receive messages and/or instructions from and/or through network 102, and forward the messages and/or instructions for storage or execution (or the like) to a respective memory or processor of the respective computing/processing device. Though network 102 is depicted as a single entity in FIG. 1 for purposes of illustration, in other examples network 102 may include a plurality of private and/or public networks over which the components of the system 100 may communicate.

The security domain 104 can be a computer hardware and software architecture for which the security threat model 106 can identify potential security threats. This computer hardware and software architecture can include personal computing devices, mobile computing devices, desktop and laptop computers, virtual appliances, containers, or any other cloud component. The security domain 104 can include networked systems 114 and a security information and event management platform (SIEM platform 116). The networked systems 114 can be one or more computer systems connected to one or more computer communication networks. For example, the networked systems 114 can include a server farm. Alternatively, or additionally, the networked systems 114 can include any number of computer and network nodes as well as associated hardware and software combinations. The SIEM platform 116 can refer to software tools and/or services that combine the management of security information and malicious attacks.

The security threat model 106 can be a machine learning model that is trained to identify a potential attack. Machine learning models can make classifications based on certain features of a state. For example, a machine learning model can classify a digital picture as either containing a human or animal subject based on the features of the digital picture. The features of the digital picture can include the colors of each pixel and the composition of the pixels in relation to each other. Using these features, a machine learning model can calculate a probability that the digital photograph contains a human or an animal subject. The machine learning model can label the digital photograph with the class having the higher probability.

In embodiments of the present disclosure, the security threat model 106 can study the features of the networked systems 114 of the security domain 104. Further, the security threat model 106 can determine the probabilities of a number of potential attack methods based on the features of the security domain 104 and networked systems 114. More specifically, the security threat model 106 can generate a quantum state probabilities (QSP) matrix 118 that represents the probabilities of a specific sequence of potential attack method types that a malicious attacker may perform. In some embodiments, a security threat model 106 can generate the QSP matrix 118 to include one probability for each potential attack method as arranged in the STIX-TAXII framework 110. The security threat model 106 may use the STIX-TAXII framework 110 as a source of potential attack methods when generating the QSP matrix 118. The EXAMPLE QSP MATRIX 1 below is one example of the QSP matrix 118:

|   | A | B | C | D | E |
|---|---|---|---|---|---|
| A | <1111111> | <10101??> | <1010101> | <1010101> | <1010101> |
| B | <1010101> | <1111111> | <1010101> | <1010101> | <1010101> |
| C | <1010101> | <1010101> | <1111111> | <1010101> | <1010101> |

-continued

|   | A | B | C | D | E |
|---|---|---|---|---|---|
| D | <1010101> | <1010101> | <1010101> | <1111111> | <1010101> |
| E | <1010101> | <1010101> | <1010101> | <1010101> | <1111111> |

Example QSP Matrix 1

In this example, the row and column headings A through E represent specific states. The states can represent a category of attack. Thus, A can represent initial access, B can represent Reconnaissance, and so on. Further, the row headings of EXAMPLE MATRIX 1 can represent a current state of a malicious actor, and the column headings can represent an inferred state of the malicious actor. The inferred state can represent the state that the security threat model 106 is going to potentially infer is the next act of the malicious actor given the initial state. Accordingly, each cell of EXAMPLE QSP MATRIX 1 can represent the calculated probability that the malicious actor proceeds from a specific (current) category of attack to another category of attack. In some embodiments of the present disclosure, the probability can be represented as an array of binary values. The array of binary values can include one value for each potential attack method in a category of attack. The QSP calculator 120 can set the binary value to 0 if the specific attack method is unlikely, and set the value to 1 if the specific attack method is likely. Thus, the binary value can be set to 1 to indicate that the specific attack method is more likely than not. Accordingly, the QSP calculator 120 can use the individual likelihood determinations of each attack method of a category to determine an aggregate likelihood that the malicious actor will commit the category of attack.

In the EXAMPLE QSP MATRIX 1, the array of binary values includes 7 values to represent 7 different phases of an attack. The "?" can represent a quantum position that is unknown; also unknown is whether the states behind the unknown will stay the same. Further, the "??" means that the probability of moving from A to B can be a predetermined threshold higher than the probability of moving from A to C because that is how it works in linear models run on classical computers.

However, the array can include more or fewer values. In some embodiments of the present disclosure, the number of values can be increased to 12, to cover the lateral area of the MITRE ATT&CK framework, and to overlay those lateral areas onto a Bloch sphere (with vectors). In some embodiments using quantum states, the number of values may be two or four. By representing the likelihoods of a malicious actor's potential actions, it can be possible to identify a pattern that enables the security domain 104 to determine response capability, target security controls to specific areas, and improve cryptographic methods accordingly.

In the EXAMPLE QSP MATRIX 1, the cell representing the probability that the malicious actor will go from a category A attack to a category B attack is represented as, "<1010101>," indicating that half of the potential attack methods within the same category are likely. Additionally, the QSP calculator 120 can consider these individual likelihoods in the aggregate to determine the likelihood of a specific category of attack. Thus, where half of the individual attack methods are likely, and considered in the aggregate, the corresponding category of attack may also be likely. In this way, the QSP matrix 118 can represent the likelihood that a malicious actor will move from one category of attack to another. Additionally, if a malicious actor moves to a specific category of attack, the QSP matrix 118 can represent the likelihood that the malicious actor uses any one of the attack methods within the category.

It is noted that the cells representing the probability that the malicious actor will use an attack method from the same category is, "<1111111>," indicating that all potential attack methods within the same category are likely. This can represent scenarios where the malicious actor merely remains in the same state. Additionally, the QSP calculator 120 can consider these individual likelihoods in the aggregate to determine that where all of the individual attack methods are likely, the corresponding category of attack is also likely.

Generating the QSP matrix 118 can involve the use of a quantum computing device, such as the quantum computing device 108. The quantum computing device 108 can be generally described in comparison with conventional computing devices, which rely on the ability to store and manipulate information in individual bits. Bits are computer storage units that store information as binary 0 and 1 states. In contrast to conventional computing devices, the quantum computing device 108 leverages quantum mechanical properties to store and manipulate information. More specifically, the quantum computing device 108 uses the quantum mechanical properties of superposition, entanglement, and interference to manipulate the state of a qubit. Superposition refers to a combination of states (described independently in conventional devices). The idea of superposition can be analogized to the field of music, where playing two musical notes at once creates a superposition of the two notes. Entanglement is a counter-intuitive quantum phenomenon describing behavior otherwise unseen in the physical universe. Entanglement refers to the phenomena of independent particles behaving together as a system.

Accordingly, the QSP calculator 120 can leverage the power of quantum computing to calculate multiple probabilities of multiple potential security threats as a problem of linear complexity. The QSP calculator 120 can include vector equations, linear algebra tables, and other relevant mathematics to calculate each probability in the QSP matrix 118. This can include the probability that a malicious actor will commit each of numerous potential categories of attack. This probability can be based on the most recent category of attack. Additionally, the QSP calculator 120 can include such mathematics to determine the probability that the malicious actor will commit each of numerous potential attack methods in a specified category of attack. In this way, the QSP calculator 120 can generate the QSP matrix 118.

In some embodiments of the present disclosure, the QSP calculator 120 can generate an initial quantum state probability matrix 118 based on historical data from the STEM platform 116, and mobile cyber ranges to look at how malicious actors executed their attacks in the past. Mobile cyber ranges refer to simulations of a security domain that are connected to a simulated Internet environment. Mobile cyber ranges can provide a safe, legal environment for security testing. Generating the QSP matrix 118 in this way, the initial quantum state probability matrix 118 can include an initial table of probabilities that are based upon past events but could be used to determine the probability that a malicious actor will commit specific categories of attack and the corresponding attack methods.

The STIX-TAXII framework 110 can include a STIX database 122 and a TAXII server 124. The term, STIX, refers to a standardized language for describing information about security threats. Thus, STIX can describe the motivations, abilities, capabilities, and responses for a security threat. STIX can be shared via TAXII or other similar tools. Further, the STIX database 122 can include a number of STIX files that describe various security threats. In some embodiments, the data from the STIX-TAXII framework 110 can be pre-loaded into a STEM engine or machine learning platform and used as the foundation of threat intelligence data. With artificial intelligence and machine learning, this can be used as training data. However, without artificial intelligence and machine learning, this can be used as a data set that a rules engine can build upon. Accordingly, when there is an attack by a malicious actor, the data from that actor or hack is compared to the pre-loaded rule set. In terms of quantum state probabilities, the data from the STIX-TAXII framework 110 can be used to set the initial vector-positions within a Bloch sphere or serve as a data set against which the quantum model, or quantum device, can be tested.

The TAXII server 124 can be a tool that defines how information about security threats can be shared via online services and message exchanges. The TAXII server 124 can provide access to the STIX database 122 by providing a RESTful API service (not shown), that is compatible with common sharing models. For example, the TAXII server 124 can define four services, which can be selected, implemented, and combined into different sharing models.

The query engine 112 can represent a computer hardware and/or software architecture that can query the security threat model 106 to identify the likelihood of a potential attack. In this way, embodiments can make it possible to predict or infer future attacks. Querying the security threat model 106 can identify the likelihood that an attack: 1) is coming from a known malicious actor because it fits a pattern; 2) fits a pattern based upon similar attacks in the past; and/or 3) will follow.

Figure 2:
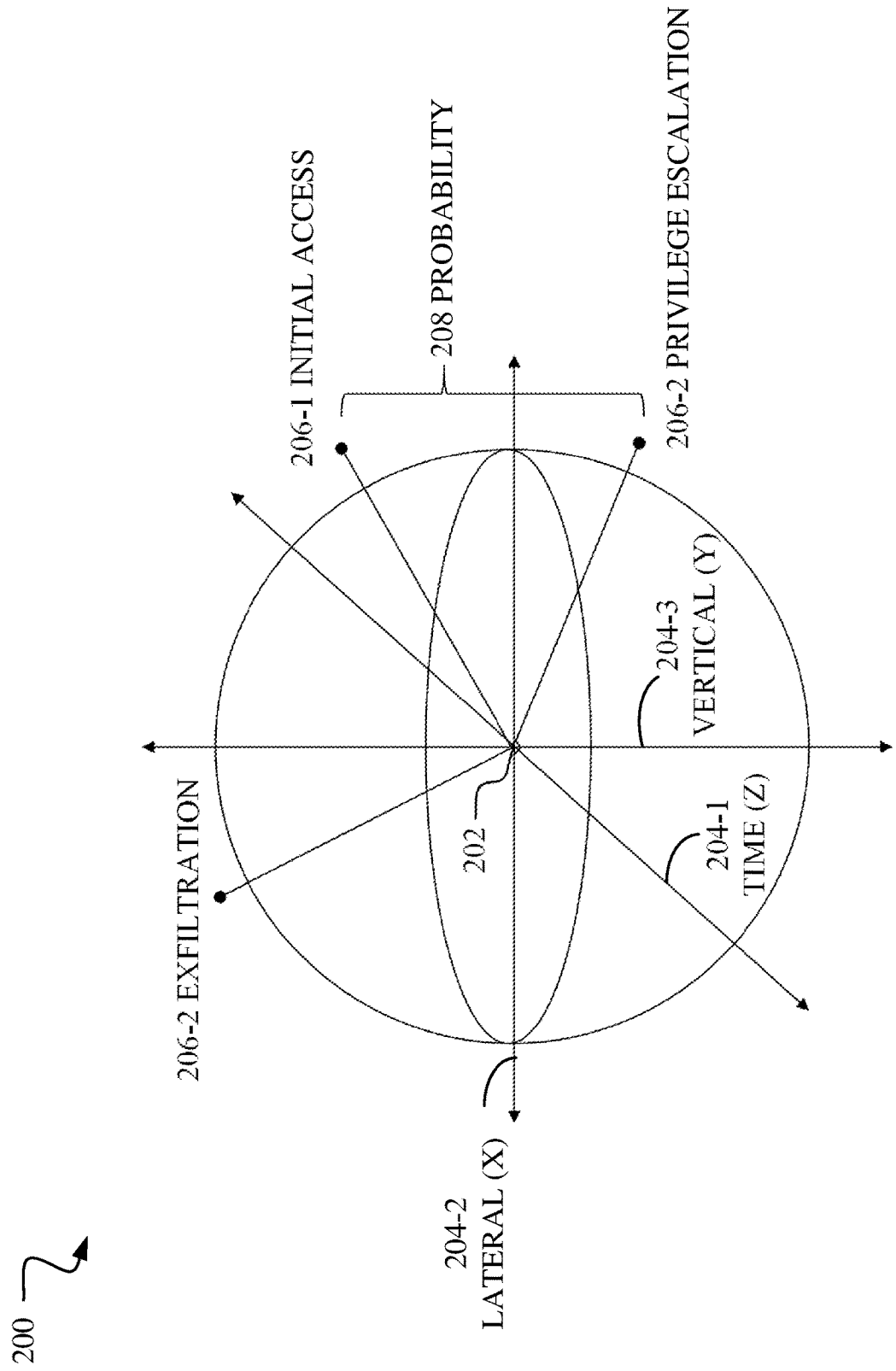
FIG. 2 is a diagram of an example Bloch sphere, in accordance with some embodiments of the present disclosure.

FIG. 2 is a diagram of an example Bloch sphere 200, in accordance with some embodiments of the present disclosure. In quantum mechanics, the Bloch sphere is a geometrical representation of the pure state space of a two-level qubit. In this example, the Bloch sphere 200 can represent the universe of potential attack methods by a single, malicious actor. Within the Bloch sphere 200, each attack method is represented by a point in three-dimensional space. The example Bloch sphere 200 includes an origin 202, at the center of the Bloch sphere 200. Additionally, the example Bloch sphere 200 includes axes 204 that define three spatial dimensions.

The axes 204 represent the three-dimensional space that the Bloch sphere 200 occupies. As a tool, the axes 204 provide a multi-dimensional space wherein the distance between two points on the surface of a sphere corresponds to the likelihood of a malicious actor perform an attack method of one category and then proceeding to perform an attack method of another category. Additionally, the axes define a multi-dimensional space wherein the distance from the origin 202 to a specified point along a vector representing a category of attack, corresponds to the likelihood that a malicious actor choosing the specified category perform the attack method corresponding to the specified point. While the example Bloch sphere 200 occupies a three-dimensional space, embodiments of the present disclosure can use Bloch spheres of three or more dimensions.

The number, and definitions, of the axes may vary but for the purpose of this example, the axes represent three dimensions, including a time (Z) axis 204-1, lateral (X) axis 204-2, and vertical (Y) axis 204-3. The time axis 204-1 can represent the time that an attack method occurs. The times that attack methods occur can be determined from sources such as, the SIEM platform 116. The time axis 204-1, lateral axis 204-2, and vertical axis 204-3 can represent traditional three-dimensional (x, y, z) space that the QSP calculator 120 can use in combination with the position points representing the attack methods in three-dimensional space as described above.

Advantageously, using a sphere instead of a linear model makes it easier to visualize the potential randomness of a malicious attack. For example, the Bloch sphere 200 includes vectors 206 that originate at the origin 202 and terminate at a point on the surface of the Bloch sphere 200. Each vector 206 represents a different category of attack methods, including, in this example, vectors 206 for the categories of initial access 206-1, privilege escalation 206-2, and exfiltration 206-3. The QSP calculator 120 can generate the vectors 206 in a Bloch sphere such that the relative position of each vector 206 to the other represents the probability that a malicious actor moves from one category of attack to another. Further, in embodiments of the present disclosure, each attack method can represent a point along the vectors. Accordingly, the distance from the origin 202 to each point can represent the probability that, if a malicious attacker selects a particular category of attack, the malicious attacker will use the particular attack method.

In this way, the QSP calculator 120 can use the points on the surface of the Bloch sphere 200 to determine a probability 208 that a malicious actor can move from one category of attack method to another. Thus, the probability that a malicious actor can move from initial access to privilege escalation is represented by the distance from one point to another in the Bloch sphere 200 between the surface points of the vectors 206 for initial access 206-1 and privilege escalation 206-2, indicated by the probability 208.

Assuming that during an attack, the initial access 206-1 attack method involves the malicious actor cracking a password. Instead of attempting to identify a future attack method based on kinetic movement (lateral thinking), the QSP calculator 120 can generate the quantum state probabilities matrix 118 based on a number of possibilities within the attack chain. The Bloch sphere 200 thus provides a way to visualize the sequence of attack methods through the use of a spherical shape. Thus, instead of being limited to a specific sequence of attack methods that occur as if in a straight two-dimensional line like the STIX-TAXII framework 110, the Bloch sphere 200 can be useful for visualizing unforeseen sequences of attack methods. For example, the malicious actor may successfully perform an initial access attack. However, instead of following the STIX-TAXII framework and next performing an execution attack, the malicious actor may next attempt an exfiltration attack. Accordingly, the example Bloch sphere 200 provides a potential path from the initial access 206-1 to exfiltration 206-3 wherein the distance represents a mathematical probability of the scenario. Accordingly, the QSP calculator 120 can use a Bloch sphere, such as the Bloch sphere 200 to populate the probabilities of the QSP matrix 118. Thus, by determining the distance between each vector 206 representing a category of attack, the QSP calculator 120 can determine the probabilities that a malicious actor moves from one category of attack to another. Further, once the malicious actor has selected the new category of attack, the QSP calculator 120 can determine the probabilities that a malicious actor attempts each of the attack methods for that category by calculating the distance from the origin to the corresponding points along the associated vector 206.

In this example, the Bloch sphere 200 includes three categories of attack, representing a typical attack method sequence. This typical attack method sequence can include accessing a system by cracking password, increasing the access authority for the malicious actor in the attacked system, and exfiltrating data. This sequence can represent a scenario where the malicious actors knows where to find the target information and thus may not scan the system's files before exfiltration.

For the purposes of clarity, the example Bloch sphere 200 includes three categories of attack. However, some embodiments of the present disclosure can include more than three categories of attack. For example, the Bloch sphere 200 can include seven categories of attack: reconnaissance, weaponization, delivery, privilege escalation, discovery, command and control, and exfiltration. Accordingly, if a malicious actor does not follow a traditional, linear attack sequence, it is possible to determine the probabilities that the malicious actor perform a delivery attack method and then discovery, or from privilege escalation back to weaponization, for example. Additionally, historical data can make it possible to determine what the attack sequence tendencies are for a particular malicious actor. For example, the historical data can show whether a malicious actor starts with binary padding or credential dumping attack methods, and also whether the malicious actor tends to us lateral movement or credential access attack methods.

Figure 3:
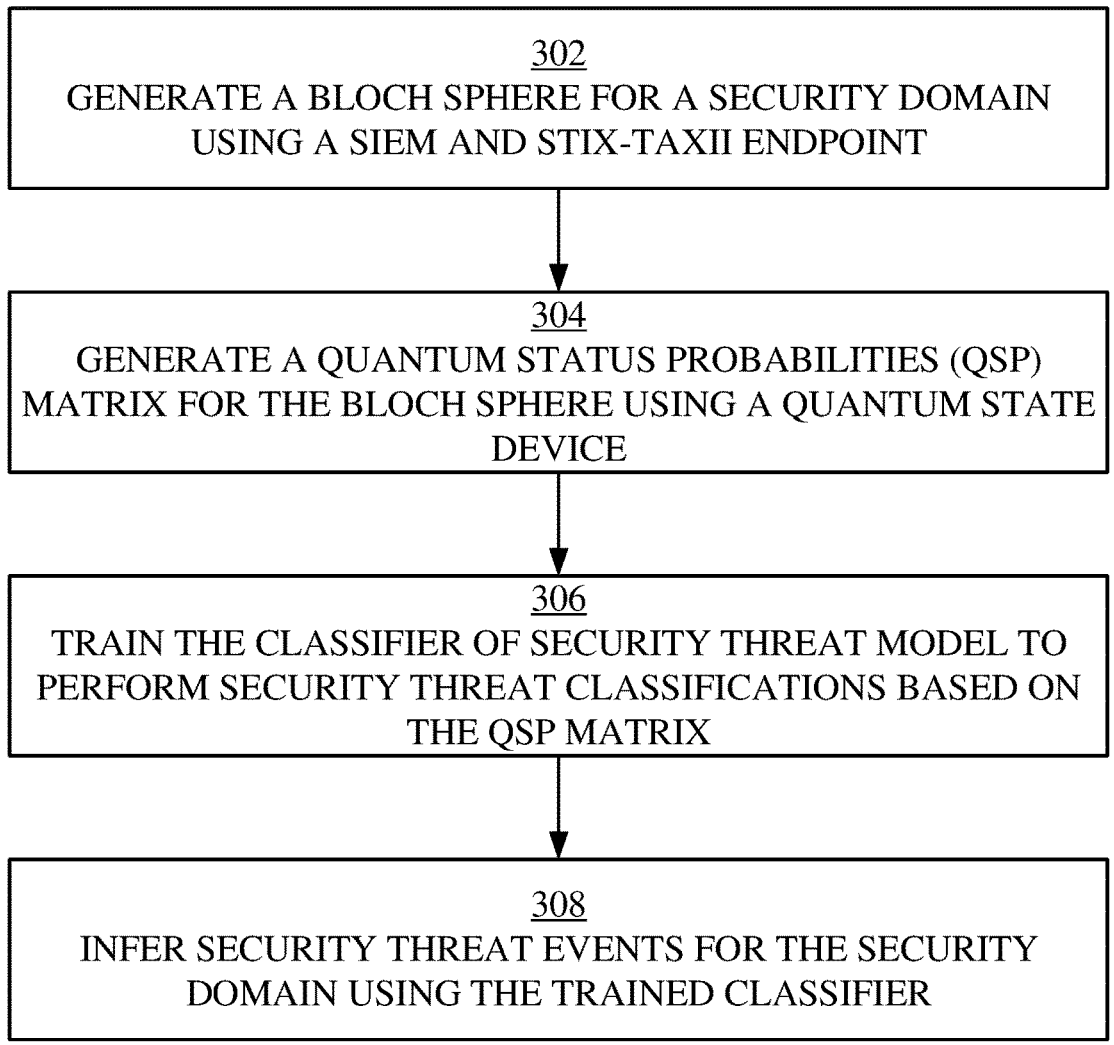
FIG. 3 is a process flow chart of a method for quantum computing machine learning model, in accordance with some embodiments of the present disclosure.

FIG. 3 is a process flow chart of a method 300 for a quantum computing machine learning model, in accordance with some embodiments of the present disclosure. A QSP calculator and security threat model (such as, the QSP calculator 120 and security threat model 106) can perform the method 300.

At operation 302, the QSP calculator 120 can generate a Bloch sphere based on a SIEM and STIX-TAXII framework. The Bloch sphere can be the Bloch sphere 200, for example. Additionally, the SIEM and STIX-TAXII framework can be the SIEM platform 116, and STIX-TAXII framework 110 described with respect to FIG. 1, respectively.

At operation 304, the QSP calculator 120 can generate a QSP matrix for the Bloch sphere 200 using a quantum state device. The QSP matrix can be, for example, the QSP matrix 118. Further, the quantum state device can be the quantum computing device 108. In some embodiments, the QSP calculator 120 can simultaneously populate all the cells of the QSP matrix using the properties of the quantum computing device 108 described above. With regard to the QSP matrix 118, as stated previously, each cell of the QSP matrix 118 can include an array of values that, in combination, represent the probability that a second type of security event occurs after a first type of security event. Further, assuming that the second type of security event does occur, each of the values in the array can indicate whether a specific security event is likely to occur.

At operation 306, the security threat model 106 can train the classifier of the security threat model 106 to perform security threat classifications based on the QSP matrix 118. Training the classifier can involve generating training data that describes features of potential security threats with labels indicating whether the features represent a security threat. The features can include data describing a specified state of the security domain 104 such as, internet protocol (IP) addresses of potential attackers, actions performed by potential attackers, and the like. In some embodiments, the security threat model 106 can select the training data features from the SIEM platform 116 and each training data transaction can be manually labeled. In this way, the classifier of the security threat model 106 can learn to identify potential security threats.

At operation 308, the security threat model 106 can infer security threat events for the security domain 104 using the trained classifier. Inferring refers to the classification process. Thus, the security threat model 106 makes an inference when its classifier determines the likely category of attack and attack method as described above. Accordingly, the query engine 112 can ask the security threat model 106 to determine what potential category of attack and attack method a malicious actor will next attempt. In response, the security threat model 106 can use the quantum status probability matrix 118 to determine what attack category and method are more comparatively likely than the others.

Figure 4:
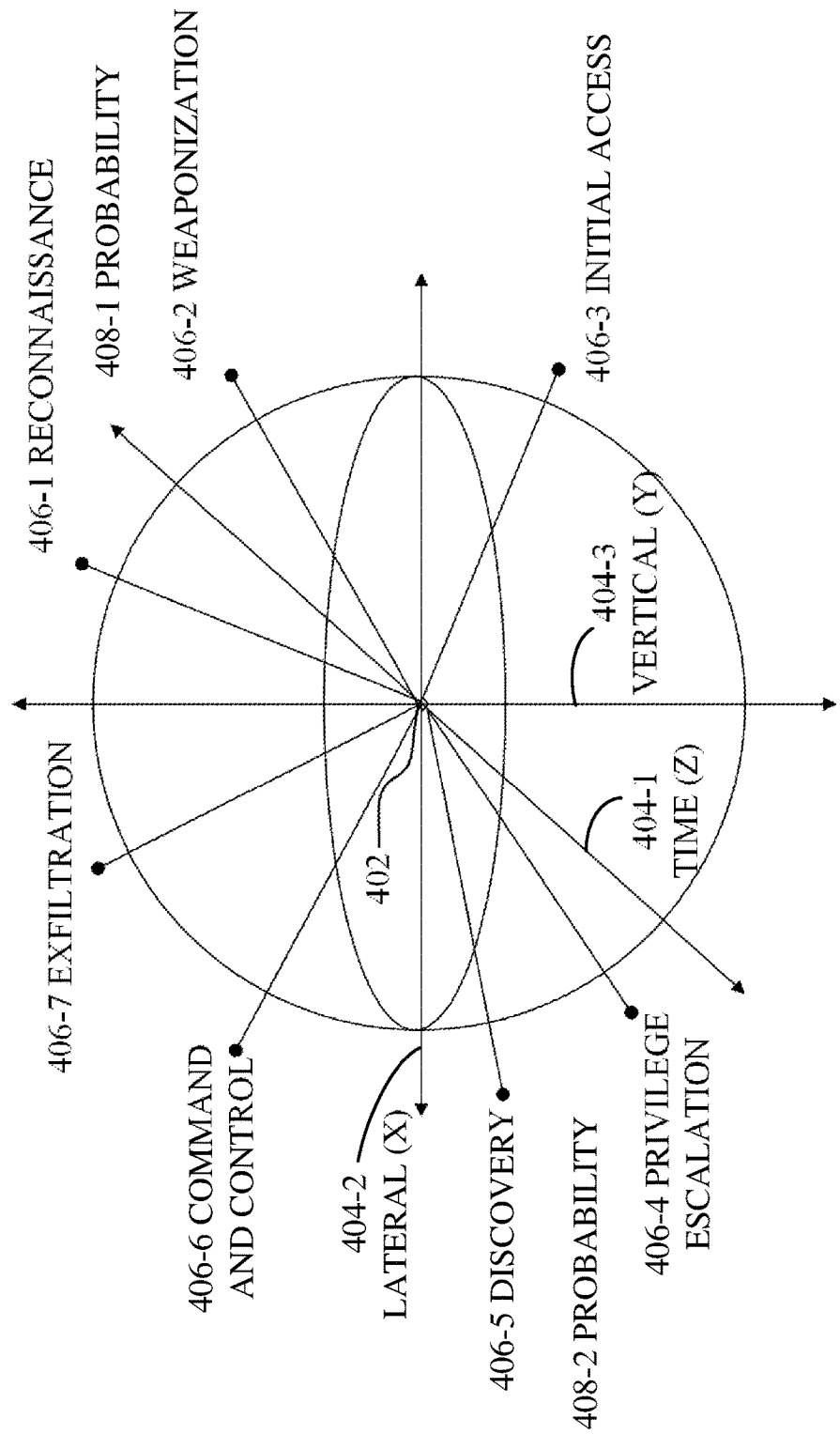
FIG. 4 is a diagram of an example Bloch sphere, in accordance with some embodiments of the present disclosure.

FIG. 4 is a diagram of an example Bloch sphere 400, in accordance with some embodiments of the present disclosure. The example Bloch sphere 400 may be similar to the example Bloch sphere 200 described with respect to FIG. 2. Accordingly, the example Bloch sphere 400 includes an origin 402, axes 404, categories of attack methods 406, and probabilities 408. Further, in the example Bloch sphere 400, the attack methods 406 include reconnaissance 406-1, weaponization 406-2, initial access 406-3, privilege escalation 406-4, discovery 406-5, command and control 406-6, and exfiltration 406-7.

In some embodiments of the present disclosure, the security threat model 106 can determine the probability that a malicious actor moves from one attack method 406 to another. For example, the security threat model 106 can determine a probability 408-1 that the malicious actor moves from reconnaissance 406-1 to weaponization 406-2. Similarly, the security threat model can determine a probability 408-2 that the malicious actor moves from privilege escalation 406-4 to discovery 406-5. However, such sequences can reflect an assumption that a single actor is executing the threat, and moving clockwise around the sphere in a systematic, rational fashion. This would be similar to kinetic warfare. However, the malicious actor could be moving in random directions and/or experimenting with different ways of attacking a target.

Thus, it is useful to know two things: 1) if an attacker starts with a specific category of attack method, e.g., a reconnaissance 406-1 attack method, what is the next likely category of attack method; and, 2) what is the next likely specific attack method? To determine the next likely category, the security threat model 106 can analyze the QSP matrix 118 having the probabilities that the malicious actor moves from reconnaissance 406-1, for example, to each of weaponization 406-2, initial access 406-3, privilege escalation 406-4, discovery 406-5, command and control 406-6, and exfiltration 406-7. To determine the next likely attack method, the security threat model 106 can analyze the probabilities of each of the potential attack methods in the next likely category in the QSP matrix 118.

In some embodiments, the security threat model 106 can use Markov chains to determine these probabilities. EXAMPLE PROBABILITY TABLE 1 demonstrates an example of probabilities that a malicious actor moves between different attack methods.

|  | Reconnaissance | Initial Access | Weaponization |
| --- | --- | --- | --- |
| Reconnaissance | 0.4 | 0.5 | 0.1 |
| Initial Access | 0.2 | 0.4 | 0.4 |
| Weaponization | 0.05 | 0.05 | 0.9 |

Example Probability Table 1

The EXAMPLE PROBABILITY TABLE 1 shows the probability that a malicious actor will go to from each attack method to the other. For example, the likelihood that a malicious actor will move from reconnaissance to initial access is at least 0.50 (e.g., 50%); the likelihood that a malicious actor will move from reconnaissance to weaponization is 0.10. This likelihood is comparatively smaller because the malicious actor has not yet gained access into the environment. Further, the likelihood that a malicious actor will move from initial access back to reconnaissance is 0.05. Additionally, the likelihood that a malicious actor will move from initial access to weaponization is at least the same as the malicious actor staying at initial access. Also, the likelihood that a malicious actor will stay at weaponization is 0.90 (very likely) compared to the probability that the malicious actor will suddenly change their mind and go backward one step to initial access (0.05) or two steps to reconnaissance (0.05).

A Markov chain may be useful when applied to a malicious actors' past behavior (for which the security threat model 106 can retrieve data from behavioral analysis tools).

Additionally, pattern recognition (which we also have data from), as a Markov event would have to have information about the prior event (event 1) to know what will happen next (event 2); and useful for looking at historical data.

Figure 5A:
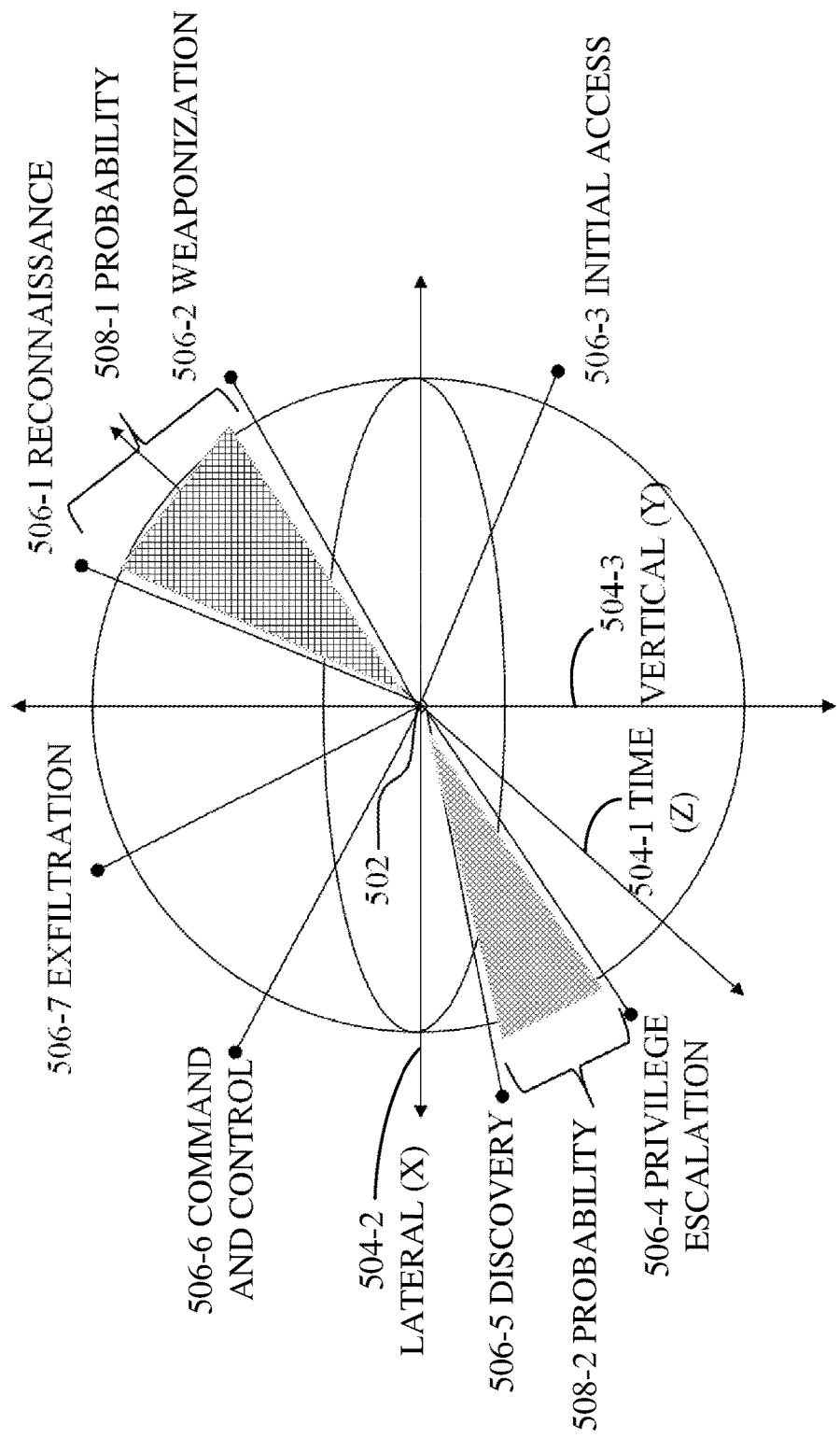
FIG. 5A is a diagram of an example Bloch sphere, in accordance with some embodiments of the present disclosure.

FIG. 5A is a diagram of an example Bloch sphere 500A, in accordance with some embodiments of the present disclosure. The example Bloch sphere 500A can be similar to the Bloch sphere 400 described with respect to FIG. 4. Accordingly, the example Bloch sphere 500A includes an origin 502, axes 504, categories of attack methods 506, and probabilities 508, which may be respectively similar to the origin 402, axes 404, attack methods 406, and probability 408 described with respect to FIG. 4. Additionally, the attack methods 506 include reconnaissance 506-1, weaponization 506-2, initial access 506-3, privilege escalation 506-4, discovery 506-5, command and control 506-6, and exfiltration 506-7.

Embodiments of the present disclosure can be useful for identifying two or more attackers that are working together in an attack against a target. Working together can include cooperating, colluding and/or defecting during the attack. Defecting refers to when one (or both) of the malicious actors stops what they are doing and walks away from the attack. Defecting only happens when the malicious actors are human. Defecting never happens when the malicious actor is software, a bot, an algorithm, or artificial intelligence.

Cooperating through cooperation, collusion, and the like, is referred to as game theory. Even though the multiple malicious actors may be executing the attack together, the malicious actors may not be working in the same categories of attack at the same time. For example, one actor may run reconnaissance 506-1 while the other is performing privilege escalation 506-4 on a security domain 104 for which the malicious actors have found credentials.

Accordingly, in some embodiments of the present disclosure, the QSP calculator 120 can generate multiple QSP matrices 118, wherein each QSP matrix 118 represents the potential actions of each of the malicious actors. Further, the security threat model 106 can compare the QSP matrices 118 for overlap. The identified overlap can indicate that multiple malicious actors are working together. For example, the probability 508-1 can represent the likelihood that a first malicious actor, having executed reconnaissance 506-1, subsequently executes weaponization 506-2. Additionally, the probability 508-2 can represent the likelihood that a second malicious actor, having executed privilege escalation 506-4, subsequently executes discovery 506-5. In embodiments of the present disclosure, the QSP matrices 118 representing likely attack methods of each of the malicious actors, can overlap. Below, EXAMPLE GAME THEORY TABLE 1 demonstrates overlapping probabilities that can indicate a two-actor game theory attack where the objective to install ransomware is successful:

|  | Reconnaissance Method | Prob. | Initial Access Method | Prob. | Weaponization Method | Prob. |
| --- | --- | --- | --- | --- | --- | --- |
| Malicious Actor (A) | X-Capture Internal Traffic | 0.5 | Y-Provide Valid Credentials | 0.45 | 0-Defect (gets caught) | 0.25 |
| Malicious Actor (B) | X-Capture External Traffic | 0.5 | Y-Uses Credentials | 0.45 | Z-Install Ransomware | 0.75 |
| Example of: | Collusion |  | Cooperation |  | Defection |  |

Example Game Theory Table 1

In a game theory attack, the probabilities of two different malicious actors using the same attack method can be nearly equal until one reaches the weaponization methods. If one of the malicious actors is caught, it may be likely that the other malicious actor proceeds with installing ransomware.

Figure 5B:
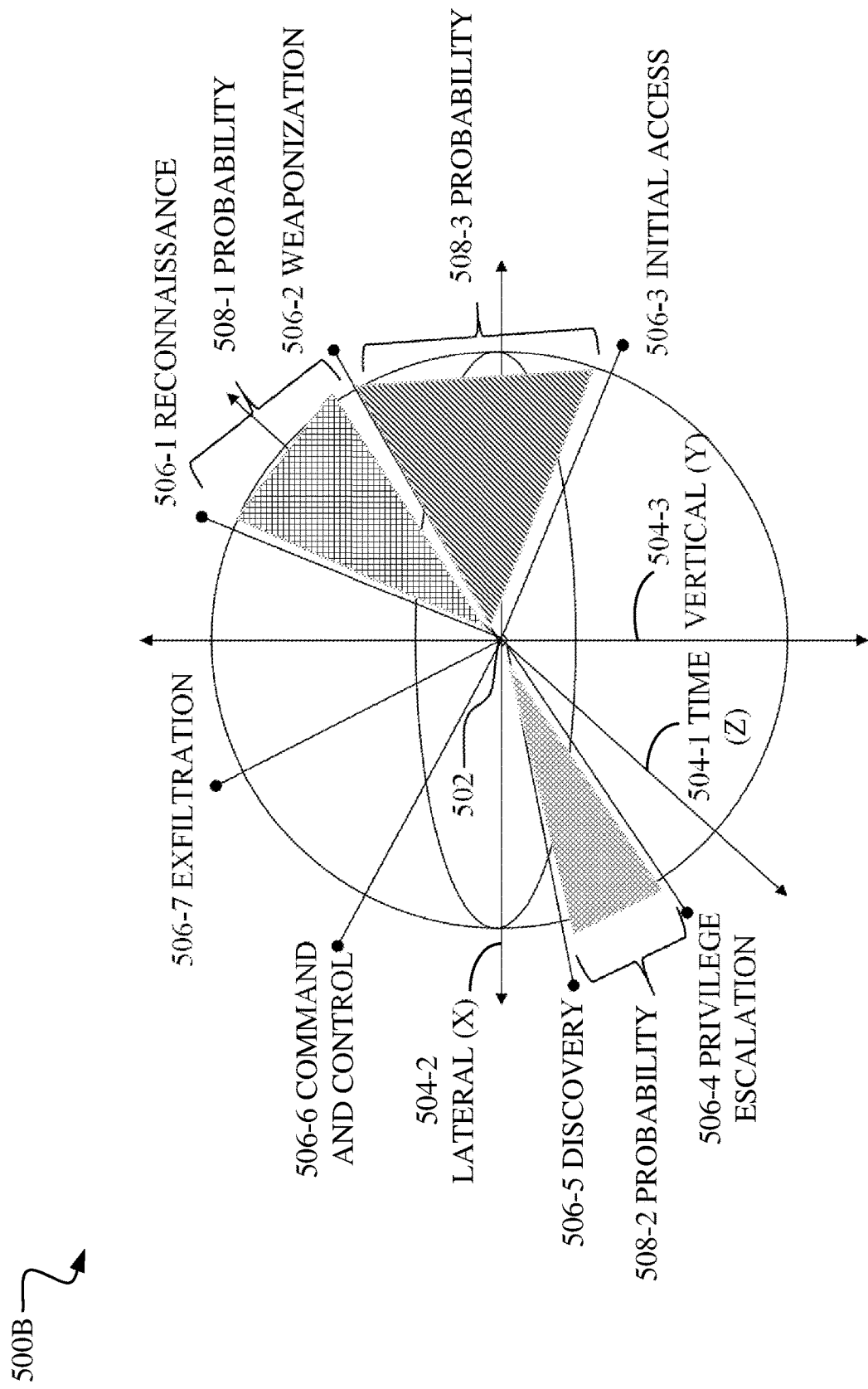
FIG. 5B is a diagram of the example Bloch sphere, in accordance with some embodiments of the present disclosure.

FIG. 5B is a diagram of the example Bloch sphere 500B, in accordance with some embodiments of the present disclosure. The example Bloch sphere 500B can be similar to the Bloch sphere 500A described with respect to FIG. 5A.

The example Bloch sphere 500B can represent a scenario where a third malicious actor is cooperating with the first two malicious actors described with respect to FIG. 5A. Accordingly, in some embodiments of the present disclosure, the QSP calculator 120 can generate three QSP matrices 118, wherein each QSP matrix 118 represents the potential actions of each of the malicious actors. In this way, the security threat model 106 can determine if there is overlap between the three malicious actors. Thus, in addition to the probabilities 508-1, 508-2, the probability 508-3 can represent the likelihood that a third malicious actor, having executed weaponization 506-2, subsequently executes initial access 506-3. The security threat model 106 can identify overlaps between the third malicious actor and either or both of the other malicious actors.

One example of a three-party game theory attack is the insider threat. During an attack with an insider threat, a third malicious actor provides information that is useful for accessing a security domain. Such information can include a security credential in the form of a badge, fob, or confidential information from a current or former employee of a company that uses the security domain 104. The Dark Web can also be a source of confidential information such as, server names, server locations, root admin credentials, and the like. Alternately, the third malicious actor can be malware such as, a script or pre-prepped code.

The EXAMPLE GAME THEORY TABLE 2 demonstrates overlapping probabilities of a three-actor attack where the objective to install ransomware is successful:

|   | Reconnaissance | Prob. | Initial Access | Prob. | Weaponization | Prob. |
|---|---|---|---|---|---|---|
| Malicious Actor (A) | 0 -Does Nothing | 0.33 | 0 -Does Nothing | 0.2 | 0 -Defect (gets caught) | 0.05 |
| Malicious Actor (B) | X -Capture External Traffic | 0.33 | Y -Provides Valid Credentials | 0.4 | 0 -Defect (quits) | 0.05 |
| Malicious Actor (C) | X -Capture Internal Traffic | 0.33 | Y -Uses Credentials | 0.4 | Z -Install Ransomware | 0.9 |
| Example of: | Majority Collusion | | Partial Cooperation | | Majority Defect | |

Example Game Theory Table 2

The EXAMPLE GAME THEORY TABLE 3 demonstrates overlapping probabilities of a different three-actor attack where the objective to install ransomware fails:

|   | Reconnaissance | Prob. | Initial Access | Prob. | Weaponization | Prob. |
|---|---|---|---|---|---|---|
| Malicious Actor (A) | 0 -Monitor Social Media | 0.5 | 0 -Does Nothing | 0.6 | 0 -Defect (gets caught) | 0.45 |
| Malicious Actor (B) | X -Capture External Traffic | 0.2 | Y -Provides Valid Credentials | 0.2 | 0 -Defect (quits) | 0.45 |
| Malicious Actor (C) | X -Capture Internal Traffic | 0.3 | Y -Uses Credentials | 0.2 | Z -Install Ransomware | 0.1 |
| Example of: | Collusion | | Partial Cooperation | | Majority Defect | |

Example Game Theory Table 3

In the EXAMPLE GAME THEORY TABLE 3, the probabilities are not evenly distributed, even at reconnaissance. Rather, the probability that malicious actor A will monitor social media is 0.50. However, the probabilities of malicious actors B and C capturing external and internal traffic, respectively, can depend on how successful malicious actor A is. The analysis can be the same for initial access. For weaponization, if malicious actor A can provide nothing of value, then gets caught and malicious actor B, who has valid credentials to offer decides the hack is too risky and quits, then malicious actor C will likely fail to install ransomware.

Figure 6:
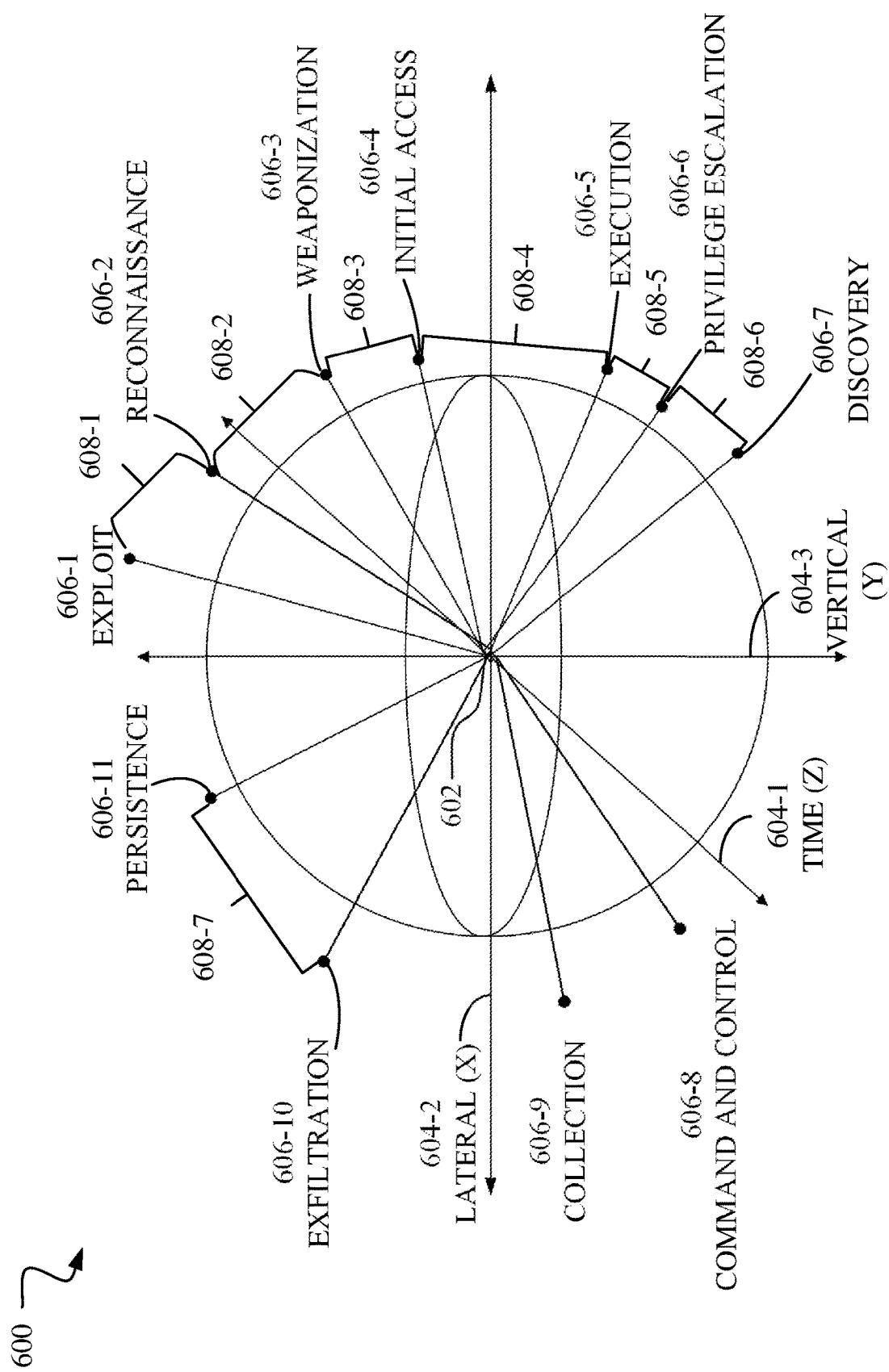
FIG. 6 is a diagram of an example Bloch sphere, in accordance with some embodiments of the present disclosure.

FIG. 6 is a diagram of an example Bloch sphere 600, in accordance with some embodiments of the present disclosure. Accordingly, the example Bloch sphere 600 includes an origin 602, axes 604, categories of attack methods 606, and probabilities 608, which may be respectively similar to the origin 402, axes 404, attack methods 406, and probability 408 described with respect to FIG. 4. Additionally, the attack methods 606 include exploit 606-1, reconnaissance 606-2, weaponization 606-3, initial access 606-4, execution 606-5, privilege escalation 606-6, discovery 606-7, command and control 606-8, collection 606-9, exfiltration 606-10, and persistence 606-11.

The example Bloch sphere 600 can represent an attack by an artificially intelligent malicious actor. The artificially intelligent malicious actor is different from a bot. A bot can be a computer program configured to perform a predetermined attack method. In contrast, an artificially intelligent malicious actor can be trained to determine various different types of methods of attack based on numerous potential scenarios. The amount of time that an artificially intelligent malicious actor takes to move through the attack methods 606 could be under 30 seconds depending on the computing power behind the artificially intelligent malicious actor. In some scenarios, the artificially intelligent malicious actor can be trained through algorithms and machine learning to find the most comparatively more effective attack method in a lesser amount of time. In these ways, the artificially intelligent malicious actor may not function like a human malicious actor. Thus, the artificially intelligent malicious actor can work its way around the sphere (i.e., perform the categories of attack methods 606 represented in the example Bloch sphere 600 relatively faster than a human malicious actor). The artificially intelligent malicious actor can also select different attack methods 606 for entry than a human actor. Thus, the entry point of an attack may not include the exploit 606-1, but may instead be a vulnerability, software bug, or malware.

Accordingly, in some embodiments of the present disclosure, the quantum state probabilities calculator 120 can generate quantum state probabilities matrices 118 for the probabilities of each transition between attack methods 606. For example, an artificially intelligent malicious actor can transition with greater speed than a human malicious actor. Thus, if the artificially intelligent malicious actor moves relatively quickly through exploit 606-1, reconnaissance 606-2, weaponization 606-3, initial access 606-4, execution 606-5, privilege escalation 606-6, discovery 606-7, exfiltration 606-10, and persistence 606-11, the security threat model 106 can identify the malicious actor by comparing the probabilities 608-1 through 608-7.

In some embodiments, the security threat model 106 can determine what kind of actor is attacking a system, i.e., is the malicious actor human or an artificially intelligent system? Additionally, the security threat model 106 can identify malicious actors with advanced skill sets and generate a probability that a specific malicious actor is a specific person in a pool of suspects.

Further, malicious actors can take advantage of scenarios where the sequence of attack methods leads to a potential exploit on a completely different system. For example, an artificially intelligent malicious actor can use an exploit 606-1 to enter a security domain (such as, the security domain 104). Once the artificially intelligent malicious actor gains a useful set of credentials (e.g., a hardcoded username and password), the credentials can be used to move to another networked system. In some embodiments of the present disclosure, the security threat model 106 can generate Bloch spheres for each networked system 114 of a security domain 104. Additionally, the quantum state probabilities calculator 120 can generate a quantum state probabilities matrix 118 representing the probabilities of a malicious actor moving from a first networked system to a second networked system as part of an attack.

Figure 7:
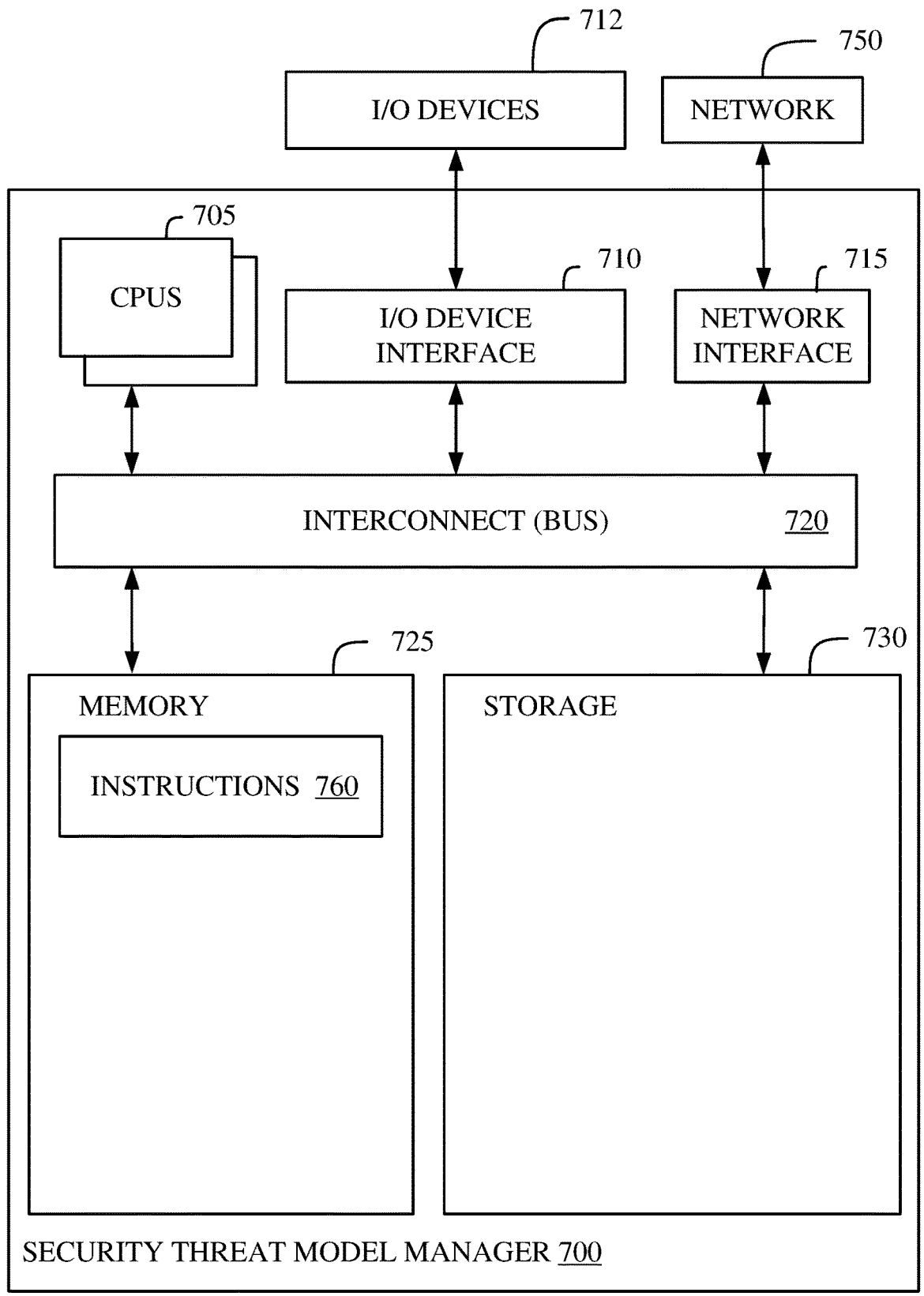
FIG. 7 is a block diagram of an example security threat model manager, in accordance with some embodiments of the present disclosure.

FIG. 7 is a block diagram of an example security threat model manager 700, in accordance with some embodiments of the present disclosure. In various embodiments, the security threat model manager 700 is similar to the incident modeler 96 and can perform the method described in FIG. 3 and/or the functionality discussed in FIGS. 1, 2, 5, and 6. In some embodiments, the security threat model manager 700 provides instructions for the aforementioned methods and/or functionalities to a client machine such that the client machine executes the method, or a portion of the method, based on the instructions provided by the security threat model manager 700. In some embodiments, the security threat model manager 700 comprises software executing on hardware incorporated into a plurality of devices.

The security threat model manager 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or the storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, and/or flash memory devices. Additionally, the storage 730 can include storage area-network (SAN) devices, the cloud, or other devices connected to the security threat model manager 700 via the I/O device interface 710 or to a network 750 via the network interface 715.

In some embodiments, the memory 725 stores instructions 760. However, in various embodiments, the instructions 760 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all of the method described in FIG. 3 and/or the functionality discussed in FIGS. 1, 2, 5, and 6.

In various embodiments, the I/O devices 712 include an interface capable of presenting information and receiving input. For example, I/O devices 712 can present information to a listener interacting with security threat model manager 700 and receive input from the listener.

The security threat model manager 700 is connected to the network 750 via the network interface 715. Network 750 can comprise a physical, wireless, cellular, or different network.

In some embodiments, the security threat model manager 700 can be a multi-user mainframe computer system, a single-user system, or a server computer or similar device that has little or no direct user interface but receives requests from other computer systems (clients). Further, in some embodiments, the security threat model manager 700 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary security threat model manager 700. In some embodiments, however, individual components can have greater or lesser complexity than as represented in FIG. 7, components other than or in addition to those shown in FIG. 7 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
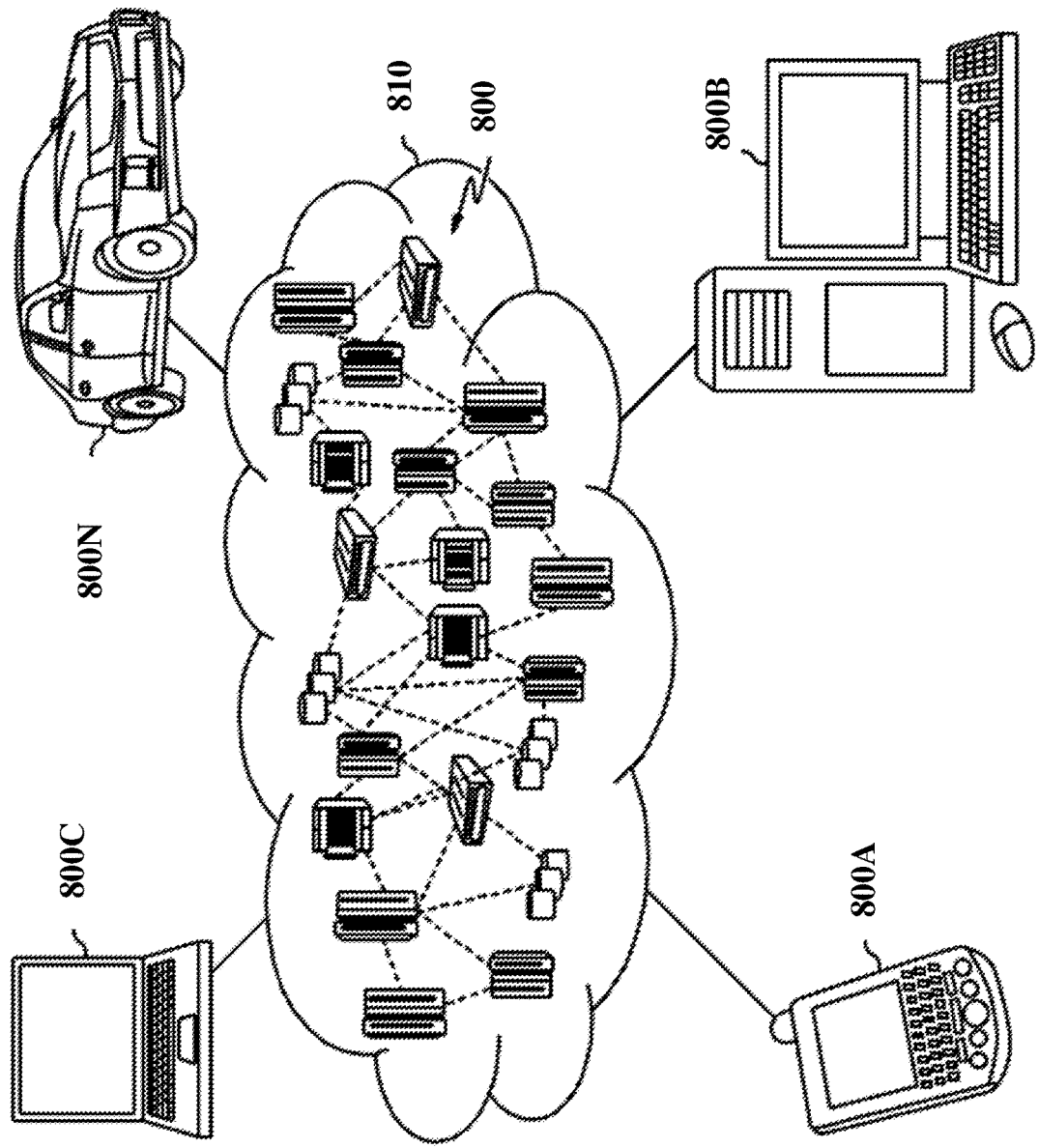
FIG. 8 is a cloud computing environment, according to some embodiments of the present disclosure.

FIG. 8 is a cloud computing environment 810, according to some embodiments of the present disclosure. As shown, cloud computing environment 810 includes one or more cloud computing nodes 800. The cloud computing nodes 800 can perform the method described in FIG. 3 and/or the functionality discussed in FIGS. 1, 2, 5, and 6. Additionally, cloud computing nodes 800 can communicate with local computing devices used by cloud consumers, such as, for example, personal digital assistant (PDA) or cellular telephone 800A, desktop computer 800B, laptop computer 800C, and/or automobile computer system 800N. Further, the cloud computing nodes 800 can communicate with one another. The cloud computing nodes 800 can also be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
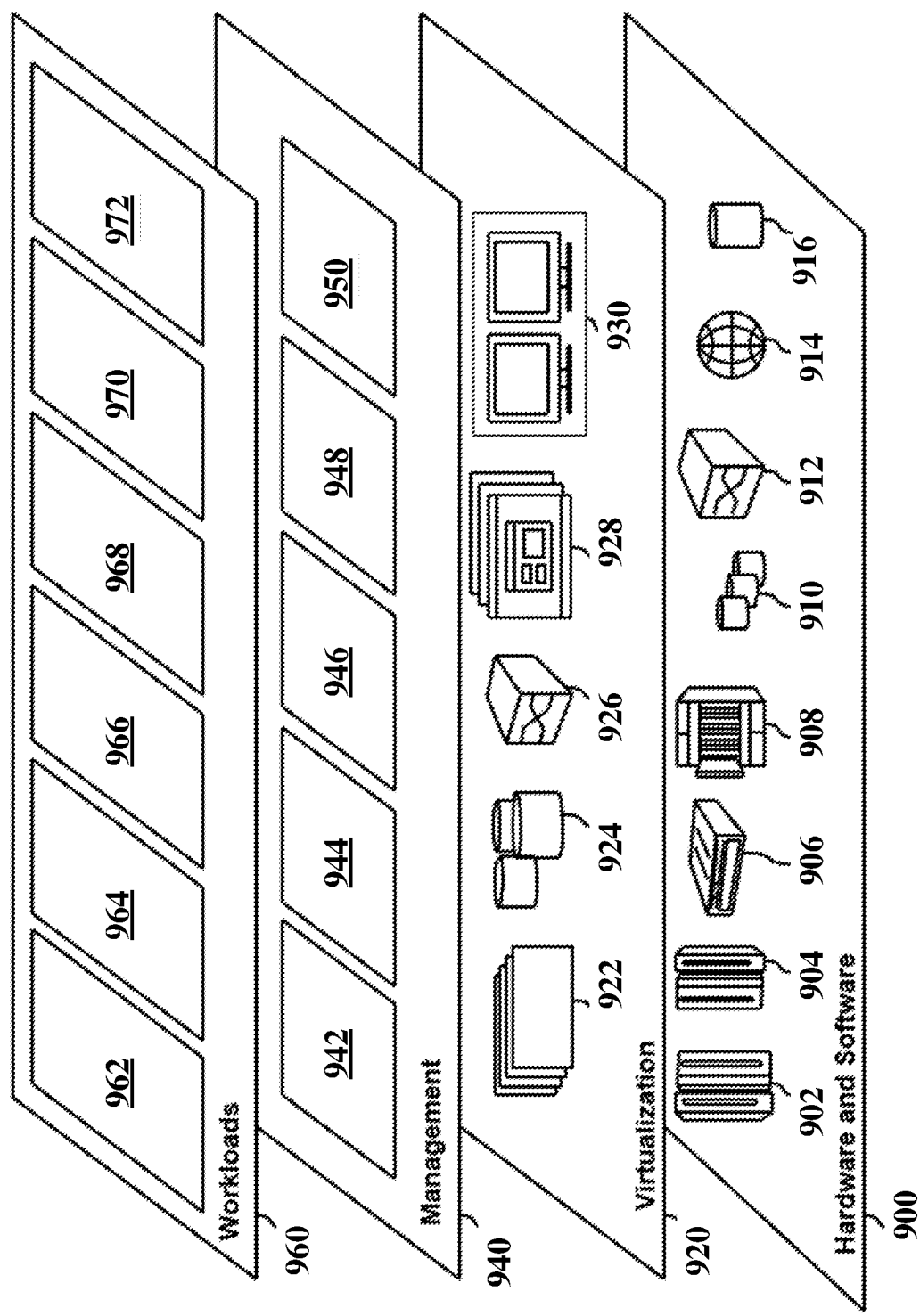
FIG. 9 is a set of functional abstraction model layers provided by cloud computing environment, according to some embodiments of the present disclosure.

FIG. 9 is a set of functional abstraction model layers provided by cloud computing environment 810 (FIG. 8), according to some embodiments of the present disclosure. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. Metering and Pricing 944 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service level management 948 can allocate suitable processing power and memory to process static sensor data. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; software development and lifecycle management 964; virtual classroom education delivery 966; data analytics processing 968; transaction processing 970; and security threat model manager 972.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, vector, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A non-limiting list of examples are provided hereinafter to demonstrate some aspects of the present disclosure. Example 1 is a computer-implemented method for a security model. The method includes generating a Bloch sphere based on a system information and event management (SIEM) of a security domain and a structured threat information expression trusted automated exchange of indicator information (STIX-TAXII); generating a quantum state probabilities matrix based on the Bloch sphere; training a security threat model to perform security threat classifications based on the quantum state probabilities matrix; and performing a machine learning classification of the security domain based on the quantum state probabilities matrix.

Example 2 includes the method of example 1, including or excluding optional features. In this example, the method includes determining that a malicious actor performs a specific category of attack based on a previous category of attack and the quantum state probabilities matrix. Optionally, the method includes determining that the malicious actor performs a specific attack method of the specific category of attack based on the specific category of attack and the quantum state probabilities matrix.

Example 3 includes the method of any one of examples 1 to 2, including or excluding optional features. In this example, the method includes determining that a plurality of malicious actors is performing a game theory attack. Optionally, determining that the malicious actors are performing the game theory attack comprises: generating a plurality of quantum state probabilities matrices for movements between a plurality of pairs of categories of attack; and determining that a plurality of probabilities overlap between two or more of the plurality of quantum state probabilities matrices.

Example 4 includes the method of any one of examples 1 to 3, including or excluding optional features. In this example, the quantum state probabilities matrix comprises a plurality of probabilities representing: a likelihood that a malicious actor moves between all potential combinations of categories of attack; and a likelihood that the malicious actor uses a specific attack method of all of the categories of attack based on a previous category of attack. Optionally, the likelihood that the malicious actor moves between a combination of the categories of attack comprises a plurality of likelihoods that the malicious actor performs a plurality of specific attack methods of a specific category of attack.

Example 5 includes the method of any one of examples 1 to 4, including or excluding optional features. In this example, the Bloch sphere comprises: an origin; and three axes representing three-dimensional space, wherein one of the three axes represent a time that an attack method is performed.

Example 6 is a computer program product comprising program instructions stored on a computer readable storage medium. The computer-readable medium includes instructions that direct the processor to generating a Bloch sphere based on a system information and event management (SIEM) of a security domain and a structured threat information expression trusted automated exchange of indicator information (STIX-TAXII); generating a quantum state probabilities matrix based on the Bloch sphere; training a security threat model to perform security threat classifications based on the quantum state probabilities matrix; and performing a machine learning classification of the security domain based on the quantum state probabilities matrix.

Example 7 includes the computer-readable medium of example 6, including or excluding optional features. In this example, the computer-readable medium includes determining that a malicious actor performs a specific category of attack based on a previous category of attack and the quantum state probabilities matrix. Optionally, the computer-readable medium includes determining that the malicious actor performs a specific attack method of the specific category of attack based on the specific category of attack and the quantum state probabilities matrix.

Example 8 includes the computer-readable medium of any one of examples 6 to 7, including or excluding optional features. In this example, the computer-readable medium includes determining that a plurality of malicious actors is performing a game theory attack. Optionally, determining that the malicious actors are performing the game theory attack comprises: generating a plurality of quantum state probabilities matrices for movements between a plurality of pairs of categories of attack; and determining that a plurality of probabilities overlap between two or more of the plurality of quantum state probabilities matrices.

Example 9 includes the computer-readable medium of any one of examples 6 to 8, including or excluding optional features. In this example, the quantum state probabilities matrix comprises a plurality of probabilities representing: a likelihood that a malicious actor moves between all potential combinations of categories of attack; and a likelihood that the malicious actor uses a specific attack method of all of the categories of attack based on a previous category of attack. Optionally, the likelihood that the malicious actor moves between a combination of the categories of attack comprises a plurality of likelihoods that the malicious actor performs a plurality of specific attack methods of a specific category of attack.

Example 10 includes the computer-readable medium of any one of examples 6 to 9, including or excluding optional features. In this example, the Bloch sphere comprises: an origin; and three axes representing three-dimensional space, wherein one of the three axes represent a time that an attack method is performed.

Example 11 is a system. The system includes instructions that direct the processor to a computer processing circuit; and a computer-readable storage medium storing instructions, which, when executed by the computer processing circuit, are configured to cause the computer processing circuit to perform a method comprising: generating a Bloch sphere based on a system information and event management (SIEM) of a security domain and a structured threat information expression trusted automated exchange of indicator information (STIX-TAXII); generating a quantum state probabilities matrix based on the Bloch sphere; training a security threat model to perform security threat classifications based on the quantum state probabilities matrix; and performing a machine learning classification of the security domain based on the quantum state probabilities matrix.

Example 12 includes the system of example 11, including or excluding optional features. In this example, the system includes determining that a malicious actor performs a specific category of attack based on a previous category of attack and the quantum state probabilities matrix; and determining that the malicious actor performs a specific attack method of the specific category of attack based on the specific category of attack and the quantum state probabilities matrix.

Example 13 includes the system of any one of examples 11 to 12, including or excluding optional features. In this example, the system includes determining that a plurality of malicious actors is performing a game theory attack, wherein determining that the malicious actors are performing the game theory attack comprises: generating a plurality of quantum state probabilities matrices for movements between a plurality of pairs of categories of attack; and determining that a plurality of probabilities overlap between two or more of the plurality of quantum state probabilities matrices.

Example 14 includes the system of any one of examples 11 to 13, including or excluding optional features. In this example, the quantum state probabilities matrix comprises a plurality of probabilities representing: a likelihood that a malicious actor moves between all potential combinations of categories of attack; and a likelihood that the malicious actor uses a specific attack method of all of the categories of attack based on a previous category of attack. Optionally, the likelihood that the malicious actor moves between a combination of the categories of attack comprises a plurality of likelihoods that the malicious actor performs a plurality of specific attack methods of a specific category of attack.

Example 15 includes the system of any one of examples 11 to 14, including or excluding optional features. In this example, the Bloch sphere comprises: an origin; and three axes representing three-dimensional space, wherein one of the three axes represent a time that an attack method is performed.

Example 16 is a computer-implemented method for a security model. The method includes instructions that direct the processor to generating a Bloch sphere based on a system information and event management (SIEM) of a security domain and a structured threat information expression trusted automated exchange of indicator information (STIX-TAXII); generating a quantum state probabilities matrix based on the Bloch sphere; and training a security threat model to perform a security threat classification based on the quantum state probabilities matrix, wherein the security threat classification infers a next category of attack against the security domain based on a previous category of attack.

Example 17 includes the method of example 16, including or excluding optional features. In this example, the method includes performing the machine learning classification of the security domain based on the quantum state probabilities matrix.

Example 18 is a computer-implemented method for a security model. The method includes instructions that direct the processor to generating a Bloch sphere based on a system information and event management (SIEM) of a security domain and a structured threat information expression trusted automated exchange of indicator information (STIX-TAXII); generating a quantum state probabilities matrix based on the Bloch sphere, wherein the quantum state probabilities matrix comprises a plurality of probabilities representing: a likelihood that a malicious actor moves between all potential combinations of categories of attack; and a likelihood that the malicious actor uses a specific attack method of all of the categories of attack based on a previous category of attack; and training a security threat model to perform a security threat classification based on the quantum state probabilities matrix, wherein the security threat classification infers a next category of attack against the security domain based on a previous category of attack.

What is claimed is:

1. A computer-implemented method for a security model, comprising:
    generating a Bloch sphere based on a system information and event management (SIEM) of a security domain and a structured threat information expression trusted automated exchange of indicator information (STIX-TAXII);
    generating a quantum state probabilities matrix based on the Bloch sphere;
    training a security threat model to perform security threat classifications based on the quantum state probabilities matrix; and
    performing a machine learning classification of the security domain based on the quantum state probabilities matrix.

2. The method of claim 1, further comprising determining that a malicious actor performs a specific category of attack based on a previous category of attack and the quantum state probabilities matrix.

3. The method of claim 2, further comprising determining that the malicious actor performs a specific attack method of the specific category of attack based on the specific category of attack and the quantum state probabilities matrix.

4. The method of claim 1, further comprising determining that a plurality of malicious actors is performing a game theory attack.

5. The method of claim 4, wherein determining that the malicious actors are performing the game theory attack comprises:
    generating a plurality of quantum state probabilities matrices for movements between a plurality of pairs of categories of attack; and
    determining that a plurality of probabilities overlap between two or more of the plurality of quantum state probabilities matrices.

6. The method of claim 1, wherein the quantum state probabilities matrix comprises a plurality of probabilities representing:
    a likelihood that a malicious actor moves between all potential combinations of categories of attack; and
    a likelihood that the malicious actor uses a specific attack method of all of the categories of attack based on a previous category of attack.

7. The method of claim 6, wherein the likelihood that the malicious actor moves between a combination of the categories of attack comprises a plurality of likelihoods that the malicious actor performs a plurality of specific attack methods of a specific category of attack.

8. The method of claim 1, wherein the Bloch sphere comprises:
    an origin; and
    three axes representing three-dimensional space, wherein one of the three axes represent a time that an attack method is performed.

9. A computer program product comprising program instructions stored on a computer readable storage medium, the program instructions executable by a processor to cause the processor to perform a method comprising:
    generating a Bloch sphere based on a system information and event management (SIEM) of a security domain and a structured threat information expression trusted automated exchange of indicator information (STIX-TAXII);

generating a quantum state probabilities matrix based on the Bloch sphere;
training a security threat model to perform security threat classifications based on the quantum state probabilities matrix; and
performing a machine learning classification of the security domain based on the quantum state probabilities matrix.

10. The computer program product of claim 9, further comprising determining that a malicious actor performs a specific category of attack based on a previous category of attack and the quantum state probabilities matrix.

11. The computer program product of claim 10, further comprising determining that the malicious actor performs a specific attack method of the specific category of attack based on the specific category of attack and the quantum state probabilities matrix.

12. The computer program product of claim 9, further comprising determining that a plurality of malicious actors is performing a game theory attack.

13. The computer program product of claim 12, wherein determining that the malicious actors are performing the game theory attack comprises:
generating a plurality of quantum state probabilities matrices for movements between a plurality of pairs of categories of attack; and
determining that a plurality of probabilities overlap between two or more of the plurality of quantum state probabilities matrices.

14. The computer program product of claim 9, wherein the quantum state probabilities matrix comprises a plurality of probabilities representing:
a likelihood that a malicious actor moves between all potential combinations of categories of attack; and
a likelihood that the malicious actor uses a specific attack method of all of the categories of attack based on a previous category of attack.

15. The computer program product of claim 14, wherein the likelihood that the malicious actor moves between a combination of the categories of attack comprises a plurality of likelihoods that the malicious actor performs a plurality of specific attack methods of a specific category of attack.

16. The computer program product of claim 9, wherein the Bloch sphere comprises:
an origin; and
three axes representing three-dimensional space, wherein one of the three axes represent a time that an attack method is performed.

17. A system comprising:
a computer processing circuit; and
a computer-readable storage medium storing instructions, which, when executed by the computer processing circuit, are configured to cause the computer processing circuit to perform a method comprising:
generating a Bloch sphere based on a system information and event management (SIEM) of a security domain and a structured threat information expression trusted automated exchange of indicator information (STIX-TAXII);
generating a quantum state probabilities matrix based on the Bloch sphere;
training a security threat model to perform security threat classifications based on the quantum state probabilities matrix; and
performing a machine learning classification of the security domain based on the quantum state probabilities matrix.

18. The system of claim 17, further comprising:
determining that a malicious actor performs a specific category of attack based on a previous category of attack and the quantum state probabilities matrix; and
determining that the malicious actor performs a specific attack method of the specific category of attack based on the specific category of attack and the quantum state probabilities matrix.

19. The system of claim 17, further comprising determining that a plurality of malicious actors is performing a game theory attack, wherein determining that the malicious actors are performing the game theory attack comprises:
generating a plurality of quantum state probabilities matrices for movements between a plurality of pairs of categories of attack; and
determining that a plurality of probabilities overlap between two or more of the plurality of quantum state probabilities matrices.

20. The system of claim 17, wherein the quantum state probabilities matrix comprises a plurality of probabilities representing:
a likelihood that a malicious actor moves between all potential combinations of categories of attack; and
a likelihood that the malicious actor uses a specific attack method of all of the categories of attack based on a previous category of attack.

21. The system of claim 20, wherein the likelihood that the malicious actor moves between a combination of the categories of attack comprises a plurality of likelihoods that the malicious actor performs a plurality of specific attack methods of a specific category of attack.

22. The system of claim 17, wherein the Bloch sphere comprises:
an origin; and
three axes representing three-dimensional space, wherein one of the three axes represent a time that an attack method is performed.

23. A computer-implemented method for a security model, comprising:
generating a Bloch sphere based on a system information and event management (SIEM) of a security domain and a structured threat information expression trusted automated exchange of indicator information (STIX-TAXII);
generating a quantum state probabilities matrix based on the Bloch sphere; and
training a security threat model to perform a security threat classification based on the quantum state probabilities matrix, wherein the security threat classification infers a next category of attack against the security domain based on a previous category of attack.

24. The method of claim 23, further comprising performing the security threat classification of the security domain based on the quantum state probabilities matrix.

25. A computer-implemented method for a security model, comprising:
generating a Bloch sphere based on a system information and event management (SIEM) of a security domain and a structured threat information expression trusted automated exchange of indicator information (STIX-TAXII);
generating a quantum state probabilities matrix based on the Bloch sphere, wherein the quantum state probabilities matrix comprises a plurality of probabilities representing:
a likelihood that a malicious actor moves between all potential combinations of categories of attack; and a likelihood that the malicious actor uses a specific attack method of all of the categories of attack based on a previous category of attack; and training a security threat model to perform a security threat classification based on the quantum state probabilities matrix, wherein the security threat classification infers a next category of attack against the security domain based on the previous category of attack.

* * * * *